United States Patent [19]

Scaduto

[11] 3,803,956
[45] Apr. 16, 1974

[54] CAM CONTROL TOOL FOR MACHINING A ROTATABLE WORKPIECE

[76] Inventor: John R. Scaduto, 14460 E. State Fair, Detroit, Mich. 48205

[22] Filed: May 1, 1972

[21] Appl. No.: 249,263

[52] U.S. Cl. ................................................ 82/19
[51] Int. Cl. .......................................... B23b 3/28
[58] Field of Search .............................. 82/18, 19

[56] References Cited
UNITED STATES PATENTS

| | | | |
|---|---|---|---|
| 1,350,735 | 8/1920 | Phillips | 82/18 X |
| 1,935,007 | 11/1933 | Bickel | 82/18 |
| 2,008,474 | 7/1935 | Smith | 82/18 |
| 2,720,130 | 10/1955 | Chang | 82/19 |
| 2,906,156 | 9/1959 | Wheeler | 82/19 |
| 2,487,994 | 11/1949 | Trevena | 82/19 |

Primary Examiner—Harrison L. Hinson

[57] ABSTRACT

A tool is mounted on a slide and advanced against the tension of a spring by a cam for machining a predetermined form on a rotatable workpiece which is driven in synchronism with the cam. While the synchronized workpiece and cam are rotated, the tool bit may be moved axially or radially of the workpiece to produce the length and the depth of the cut.

1 Claim, 10 Drawing Figures

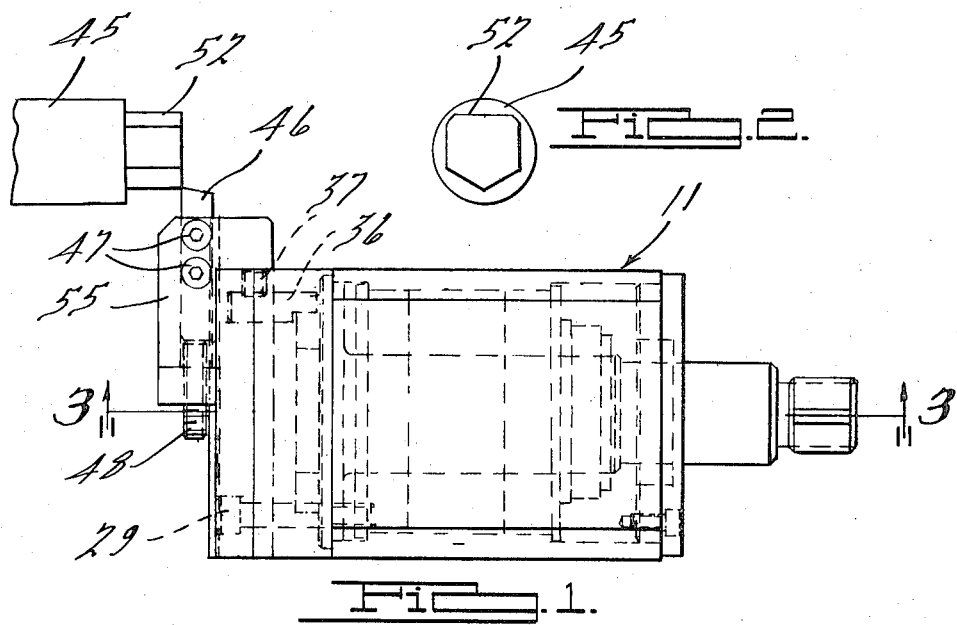
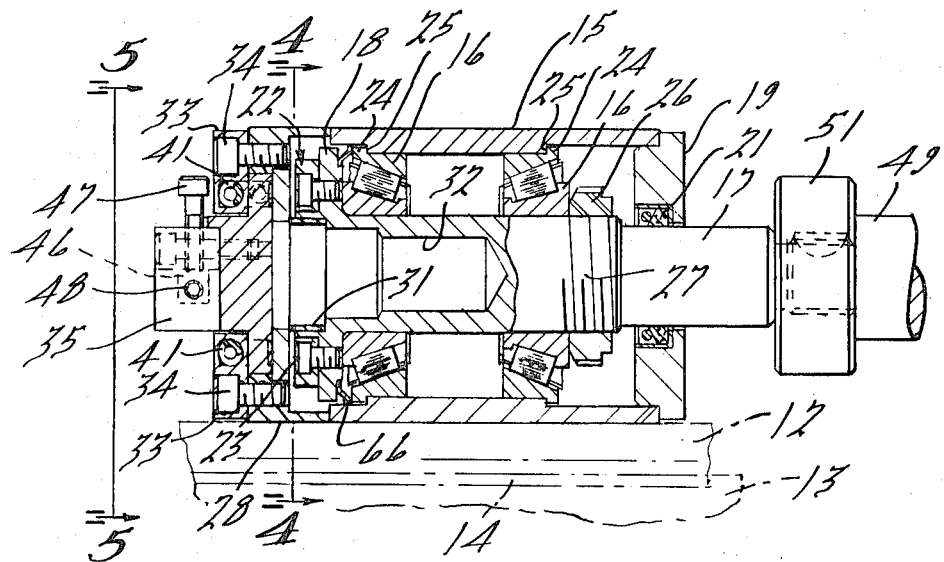

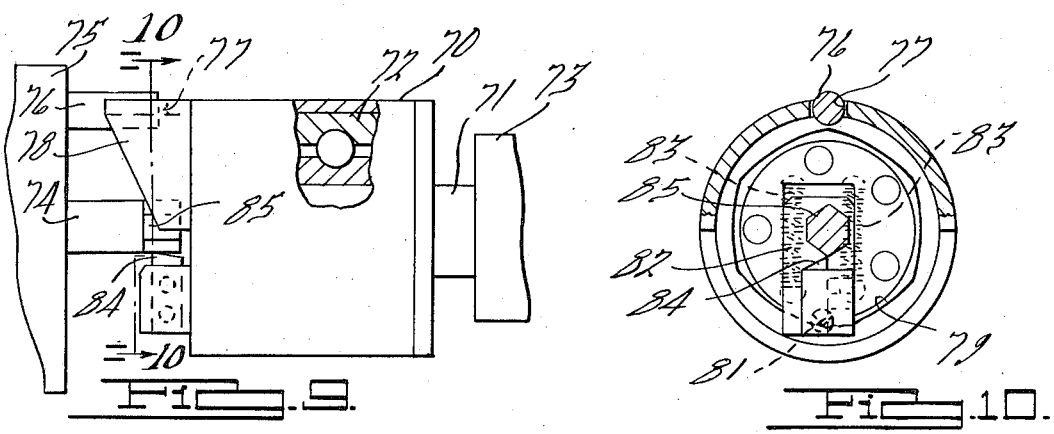
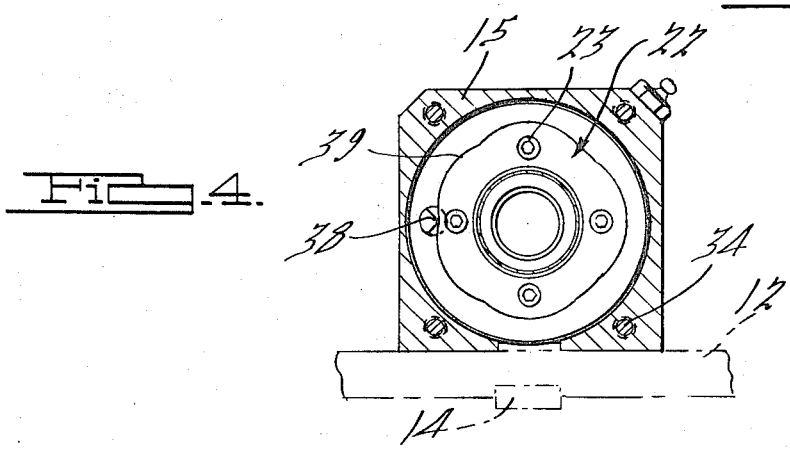
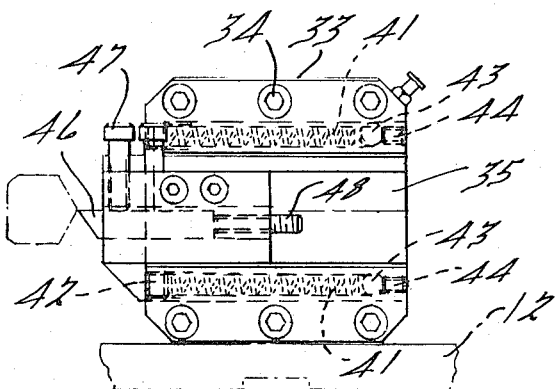

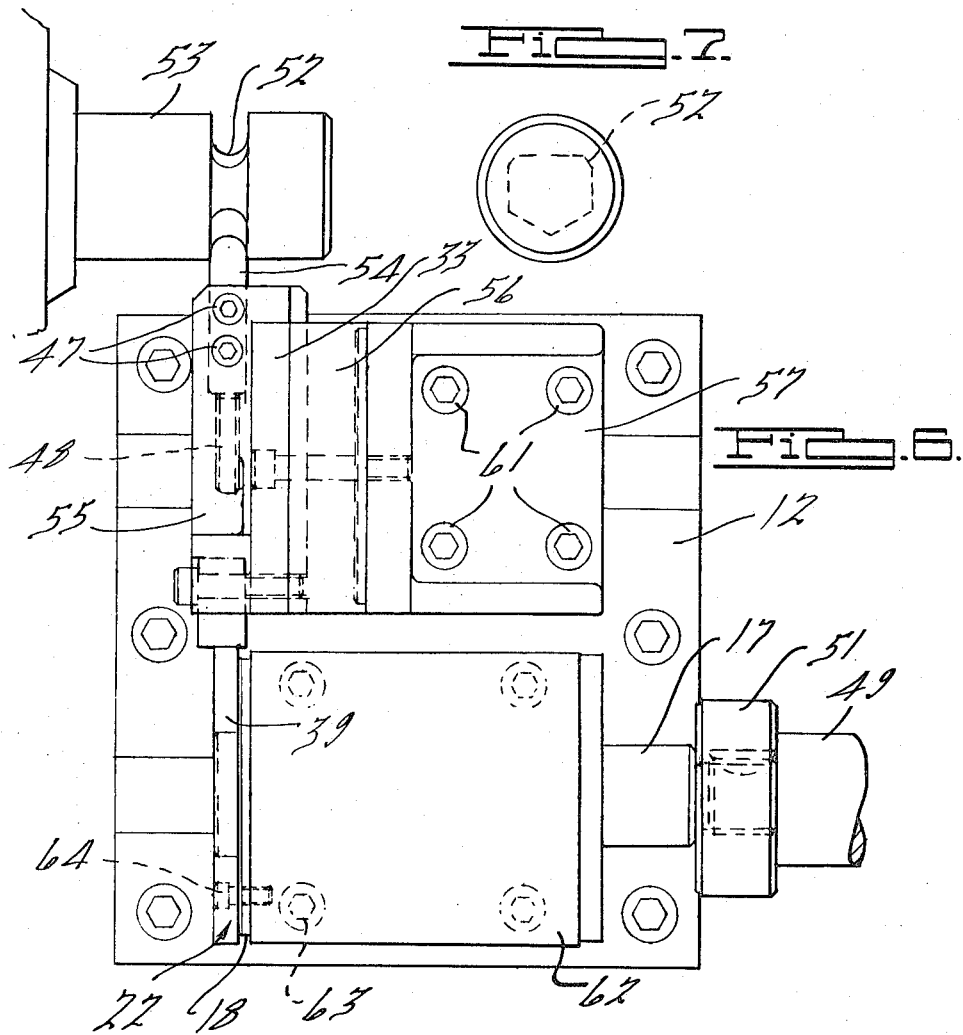
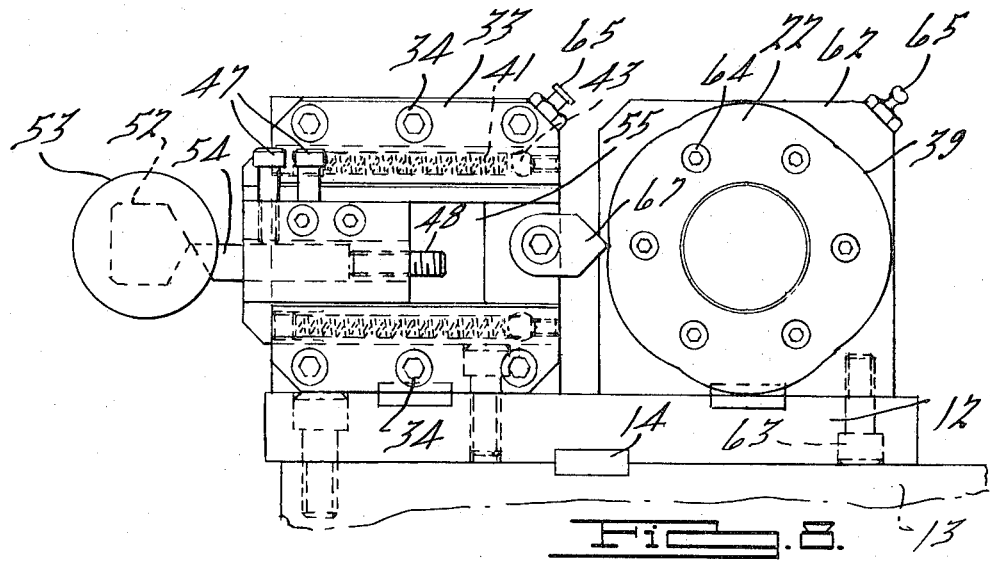

CAM CONTROL TOOL FOR MACHINING A ROTATABLE WORKPIECE

BACKGROUND OF THE INVENTION

Reference may be had to the British Pat. Nos. 629,081 and 659,436 which were uncovered to show the state of the art. Both of these patents disclose internal straight sided cams in the nature of a hexagon for producing a hexagon shape on a cylindrical workpiece.

SUMMARY OF THE INVENTION

The invention pertains to a cam operated tool for producing a multi-sided figure on a workpiece which is rotated in synchronism with a cam which advances the tool bit toward the workpiece and which is moved therefrom by spring means. The tool may be advanced toward the axis of the workpiece and/or moved therealong to widen and/or increase the depth of cut. The cam lobes are arcuate in shape and are herein illustrated as having four lobes of the same length joined together with a fifth lobe approximately twice the length of one of the four lobes to complete the cam. This will produce a four sided figure on the workpiece with a fifth side disposed perpendicular to the two parallel sides of the figure. The device is mountable on a lathe with the workpiece driven by the headstock with the cam and tool bit unit mounted on a slide which may be moved parallel to the axis of the workpiece and normal thereto for advancing the tool into the workpiece. A universally movable drive shaft is operated at the same speed of rotation as the workpiece and employed to drive the cam in synchronism with the rotation thereof in a manner to permit the sifting of the lathe slide as mentioned above.

BRIEF DESCRIPTION OF THE DRAWINGS

FIG. 1 is a plan view of a tool holder mounted on the slide of a lathe or like machine with the tool bit in engagement with the workpiece substantially at the time that the machining operation is completed;

FIG. 2 is an end view of the completed workpiece illustrated in FIG. 1;

FIG. 3 is a sectional view of the structure illustrated in FIG. 1, taken on the line 3—3 thereof;

FIG. 4 is a sectional view of the structure illustrated in FIG. 3, taken on the line 4—4 thereof;

FIG. 5 is an end view of the structure illustrated in FIG. 3, as viewed from line 5—5 thereof;

FIG. 6 is a view of structure, similar to that illustrated in FIG. 1, showing another form of the invention;

FIG. 7 is an end view of the finished workpiece illustrated in FIG. 6;

FIG. 8 is a lefthand view in elevation of the structure illustrated in FIG. 6;

FIG. 9 is a view in elevation of a positive drive between the rotating workpiece and the support for a cam which is of the internal type, and FIG. 10 is a sectional view of the structure illustrated in FIG. 9, taken on the line 10—10 thereof.

DESCRIPTION OF THE PREFERRED EMBODIMENTS

Referring to FIGS. 1 to 5, a cam controlled tool unit 11 is illustrated mounted on a base 12 which is secured to a lathe or similar machine slide 13 on which it is accurately located by a key 14. The tool supporting element 11 has a hollow body 15 for supporting a pair of tapered roller bearings 16 and a spindle 17 which has a head 18 on the inner end spaced from the end of the body 15. The opposite end of the body 15 is closed by an end plate 19 which is sealed to the spindle 17 by a conventional sealing element 21. The spindle head 18 has a cam plate 22 secured thereto by screws 23. The bearing 16 has an annular rib 24 at the end which engages the internal shoulders 25 of the body 15 when the bearings are moved toward each other by a clamping nut 26 on a threaded section 27 of the spindle 17. When the spindle 17 is rotated, the cam plate 22 rotates therewith. The cam plate is enclosed in an end element 28 which is secured to the body 15 by a plurality of screws 29. The spindle 17 has a sealing sleeve 31 mounted in the end of the hollow interior section 32.

A pair of gibs 33 are secured to the end element 28 by a plurality of screws 34. The gibs confine a tool bit supporting slide 35 for reciprocating movement. The slide is moved toward the workpiece by a pin 36 fixed in position by a set screw 37 with the pointed end 38 engaging the edge 39 of the cam plate 22, as illustrated more specifically in FIG. 4. A spring 41 is mounted in an aperture in each of the gibs 33 with one end abutting a set screw 42 which adjusts the pressure exerted thereby. The opposite end of the spring engages a pin 43 on the tool supporting slide 35 which is secured in position by a set screw 44. The slide 35 is urged by the springs 41 away from a workpiece 45 and is moved theretoward against the tension of the springs 41 by the cam plate 22.

A tool bit 46 is secured in the tool slide 35 by a pair of screws 47, the tool being adjusted lengthwise to a desired position by a set screw 48. The workpiece 45 is supported in the headstock of a lathe to be driven at a predetermined speed of rotation. A universally movable drive element 49 is secured to the spindle 17 by a drive ring 51 so as to have the spindle and the cam plate 22 mounted thereon, driven at the same speed as the workpiece 45. The slide 13 can be operated to move the tool bit 46 toward the axis of the workpiece and axially therealong for machining the odd shaped end 52 on the end of the workpiece 45 as illustrated in FIG. 2.

In FIGS. 6, 7 and 8, a similarly shaped section 52 is machined on a workpiece 53 inwardly from the end thereof by the reciprocation of a tool bit 54. A tool slide 55 supports the bit 54 when secured by the screws 47 after being adjusted to a desirable position by the set screw 48. The slide 55 is supported by the gibs 33 on a body 56 secured to a supporting plate 57 which is secured to a supporting base plate 12 by a plurality of screws 61. A spindle supporting housing 62 is secured to the plate 12 by a plurality of screws 63. The housing supports a spindle 17 in the same manner as described above with regards to the structure of FIG. 3, the spindle being driven by a universally movable drive element 49 through a drive ring 51. The head 18 of the spindle has the cam plate 22 secured thereto by a plurality of screws 64. The housing is lubricated in the normal manner through a lubricating fitting 65. An oil seal washer 66 is provided between the head 18 and innermost race 16, as illustrated in FIG. 3, for sealing the interior area of the body which is maintained lubricated. The slide 55 has a pointed stylus 67 in engagement with the edge 39 of the cam plate 22 for advancing the slide against the tension of the springs 41 and machining the shaped section 52 on the workpiece 53 inwardly of the end thereof.

Referring to FIGS. 9 and 10, a further form of the invention is illustrated that wherein a body 70 supports a spindle 71 on a bearing 72 for rotation thereon when the spindle is secured in fixed position on a supporting element 73. A workpiece 74 is supported in a chuck 75 of a lathe or other machine which provides a drive therefor. the chuck has a drive pin 76 which extends within a slot 77 in an extension 78 of the spindle supporting body 70. The rotation of the workpiece 74 by the chuck 75 rotates the body 70 in synchronization therewith. The body 70 has a hexagon shaped internal cam 79 engaged by a cam follower 81 on a slide 82 which is urged by a pair of springs 83 toward the cam 79. The slide supports a tool bit 84 which is secured thereto in the conventional manner. With this arrangement, the securement of the spindle against rotation permits the body 70 to be driven by the chuck 75 through the drive pin 76 to have the internal cam 79 rotate in synchronism with the rotation of the workpiece 74. Since six cam surfaces are illustrated, a hexagon end 85 is machined on the end of the workpiece 74.

In any of the machining devices herein illustrated and described, a predetermined form can be machined on the end or inwardly of the end of a workpiece depending upon the shape of the lobes of the cam which is driven in synchronism with the rotation of the workpiece. A cam follower on a slide which supports the tool bit is urged against the cam surface by springs which retain the follower in engagement with the lobe surfaces. The tool bit is positively moved toward the workpiece and moved therefrom by springs which retain the follower in engagement with the cam surfaces. The same form can be reproduced any number of times on workpieces by the use of the cam operated tool bit supporting slide.

I claim:

1. A cam controlled tool for machining a predetermined form on a workpiece, a fixed housing, bearing means within said housing having its center on the center of the housing, a spindle rotatably mounted in said housing on said bearing means, a cam plate within said housing having a plurality of lobes, said cam plate being secured to said spindle to be normal to the axis thereof, a slide in said housing spaced from and disposed parallel to said cam plate, a cam follower extending transversely from said slide in position for engagement by the cam lobes, spring means for urging said slide and cam follower toward said cam lobes, a rotatable support for a workpiece, a drive for said rotatable support, universally movable drive means operated by said drive for rotating said spindle in synchronism with the rotation of said rotatable support, and a tool bit on said slide movable by said cam lobes to produce a desired shape on a workpiece.

* * * * *